(12) United States Patent
Bae (10) Patent No.: US 11,070,278 B2
(45) Date of Patent: Jul. 20, 2021

(54) ANTENNA APPARATUS, CONTROL METHOD OF ANTENNA APPARATUS, VEHICLE HAVING THE ANTENNA APPARATUS

(71) Applicants: Hyundai Motor Company, Seoul (KR); Kia Motors Corporation, Seoul (KR)

(72) Inventor: Jungnam Bae, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 174 days.

(21) Appl. No.: 16/138,002

(22) Filed: Sep. 21, 2018

(65) Prior Publication Data

US 2019/0149218 A1 May 16, 2019

(30) Foreign Application Priority Data

Nov. 15, 2017 (KR) .................. 10-2017-0151955

(51) Int. Cl.
| | |
|---|---|
| *H04B 7/08* | (2006.01) |
| *H04B 7/12* | (2006.01) |
| *H04B 7/06* | (2006.01) |
| *H01Q 1/32* | (2006.01) |
| *H04L 1/04* | (2006.01) |
| *H04L 1/06* | (2006.01) |

(52) U.S. Cl.
CPC .......... *H04B 7/082* (2013.01); *H01Q 1/3275* (2013.01); *H04B 7/0602* (2013.01); *H04B 7/12* (2013.01); *H04L 1/04* (2013.01); *H04L 1/06* (2013.01)

(58) Field of Classification Search
CPC .... H01Q 1/3275; H04B 7/0602; H04B 7/082; H04B 7/0837; H04B 7/12; H04L 1/04; H04L 1/06
USPC .......................... 455/13.3, 464, 25, 63.4, 82
See application file for complete search history.

(56) References Cited

U.S. PATENT DOCUMENTS

| | | | |
|---|---|---|---|
| 4,383,242 A * | 5/1983 | Sassover ............. | B60R 25/1001 180/287 |
| 4,628,517 A | 12/1986 | Schwarz et al. | |
| 5,345,601 A | 9/1994 | Takagi et al. | |

(Continued)

FOREIGN PATENT DOCUMENTS

| | | |
|---|---|---|
| JP | S57121335 A | 7/1982 |
| JP | S57121336 A | 7/1982 |

(Continued)

*Primary Examiner* — Tan H Trinh
(74) *Attorney, Agent, or Firm* — Mintz Levin Cohn Ferris Glovsky and Popeo, P.C.; Peter F. Corless (57) ABSTRACT

An antenna apparatus can include: a first antenna configured to receive a first plurality of signals including a signal in one frequency band as a signal in a fundamental frequency band and a signal in another frequency band as a signal in a harmonic frequency band; a second antenna configured to receive a second plurality of signals including a signal in the other frequency band as a signal in the fundamental frequency band and a signal in the one frequency band as a signal in the harmonic frequency band; and a controller configured to combine a signal from the first plurality of signals in a frequency band that is selected by a user with a signal from the second plurality of signals in the frequency band that is selected by the user.

10 Claims, 7 Drawing Sheets

(56) References Cited

U.S. PATENT DOCUMENTS

| | | | | |
|---|---|---|---|---|
| 6,643,494 B1* | 11/2003 | Worthy | ............... | H04H 60/44 |
| | | | | 455/2.01 |
| 6,684,054 B1* | 1/2004 | Worthy | ............... | H04H 60/44 |
| | | | | 455/150.1 |
| 9,342,716 B2* | 5/2016 | Raptis | ............... | G06K 7/10128 |
| 2009/0273531 A1* | 11/2009 | Ishizuka | ............... | H01Q 21/28 |
| | | | | 343/750 |
| 2012/0081253 A1* | 4/2012 | Duzdar | ............... | H01Q 21/28 |
| | | | | 343/713 |
| 2012/0188143 A1* | 7/2012 | Yang | ............... | H01Q 1/42 |
| | | | | 343/872 |
| 2014/0145897 A1* | 5/2014 | Sonnerat | ............... | H01Q 21/28 |
| | | | | 343/853 |
| 2014/0312937 A1* | 10/2014 | Ehlers | ............... | H03B 19/14 |
| | | | | 327/119 |
| 2014/0329475 A1* | 11/2014 | Ella | ............... | H04B 1/52 |
| | | | | 455/77 |
| 2015/0288440 A1 | 10/2015 | Imao | | |
| 2016/0104932 A1* | 4/2016 | Aminzadeh | ............... | H01Q 1/42 |
| | | | | 343/872 |
| 2017/0054204 A1* | 2/2017 | Changalvala | ............... | H01Q 1/2291 |
| 2017/0214112 A1* | 7/2017 | Ohno | ............... | H01Q 1/3275 |
| 2017/0324139 A1* | 11/2017 | Talty | ............... | H01Q 13/20 |

FOREIGN PATENT DOCUMENTS

| | | |
|---|---|---|
| JP | H06224803 A | 8/1994 |
| JP | H0955692 A | 2/1997 |
| JP | 2007500338 A | 1/2007 |
| JP | 2015109594 A | 6/2015 |

* cited by examiner

ANTENNA APPARATUS, CONTROL METHOD OF ANTENNA APPARATUS, VEHICLE HAVING THE ANTENNA APPARATUS

CROSS-REFERENCE TO RELATED APPLICATION

This application is based on and claims priority under 35 U.S.C. § 119 to Korean Patent Application No. 10-2017-0151955, filed on Nov. 15, 2017 in the Korean Intellectual Property Office, the disclosure of which is incorporated by reference herein in its entirety.

BACKGROUND

1. Technical Field

Embodiments of the present disclosure relate to an antenna apparatus, a control method of the antenna apparatus, and a vehicle having the same and, more particularly, to an antenna apparatus using a plurality of antennas operating in different frequency bands, a control method of the antenna apparatus, and a vehicle having the same.

2. Description of Related Art

Vehicles are generally provided with an antenna capable of receiving radio waves for receiving a radio broadcast. Recently, a Multiple Input Multiple Output (MIMO) antenna system capable of exchanging data at a high-speed using a plurality of antennas has been used in vehicles. The plurality of antennas may receive a variety of signals transmitted in the same frequency band using a "diversity method," and thus the antenna apparatus is capable of receiving greater data than in the past.

These antennas may operate in any one frequency band, or may operate in various frequency bands. When a plurality of antennas operate in different frequency bands, the plurality of antennas may operate independently. As a result, each antenna cannot contribute to the improvement of the signal quality at each frequency band. Therefore, the vehicle antenna apparatus may need additional antennas operating in the same frequency band to implement the aforementioned diversity method.

SUMMARY

Therefore, it is an aspect of the present disclosure to provide an antenna apparatus capable of implementing a diversity method using a plurality of antennas operating in different frequency bands, a control method of the antenna apparatus, and a vehicle having the same.

Additional aspects of the present disclosure will be set forth in part in the description which follows and, in part, will be apparent from the description, or may be learned by practice of the present disclosure.

In accordance with embodiments of the present disclosure, an antenna apparatus can include: a first antenna configured to receive a first plurality of signals including a signal in one frequency band as a signal in a fundamental frequency band and a signal in another frequency band as a signal in a harmonic frequency band; a second antenna configured to receive a second plurality of signals including a signal in the other frequency band as a signal in the fundamental frequency band and a signal in the one frequency band as a signal in the harmonic frequency band; and a controller configured to combine a signal from the first plurality of signals in a frequency band that is selected by a user with a signal from the second plurality of signals in the frequency band that is selected by the user.

The antenna apparatus may further include a first filter configured to extract a signal in the one frequency band from the first plurality of signals; and a second filter configured to extract a signal in the other frequency band from the second plurality of signals.

The antenna apparatus may further include a selector configured to receive a plurality of signals from the first antenna or the second antenna in the frequency band, which is not selected by the user between the one frequency band and the other frequency band, as the fundamental frequency band; and a third filter configured to extract a signal in the frequency band that is selected by the user among the plurality of signals received by the selector.

The antenna apparatus may further include a signal storage to store signals extracted by the third filter.

The controller may be further configured to combine a signal extracted by the first filter or the second filter with a signal extracted by the third filter.

The one frequency band may include frequencies from 88 MHz to 108 MHz, and the other frequency band may include frequencies from 174 MHz to 240 MHz.

The antenna apparatus may further include a tuner to extract a signal in the frequency band selected by the user by tuning a frequency in the frequency band selected by the user.

The antenna apparatus may further include a housing having a shark fin-like shape.

Furthermore, in accordance with embodiments of the present disclosure, a control method of an antenna apparatus can include: receiving a first plurality of signals via a first antenna, the first plurality of signals including a signal in one frequency band as a signal in a fundamental frequency band and a signal in another frequency band as a signal in a harmonic frequency band; receiving a second plurality of signals via a second antenna, the second plurality of signals including a signal in the other frequency band as a signal in the fundamental frequency band and a signal in the one frequency band as a signal in a harmonic frequency band; and combining, by a controller, a signal from the first plurality of signals in a frequency band that is selected by a user with a signal from the second plurality of signals in the frequency band that is selected by the user.

The control method can further include extracting, by a first filter, a signal in the one frequency band from the first plurality of signals; and extracting, by a second filter, a signal in the other frequency band from the second plurality of signals.

The control method may further include extracting, by a third filter, a signal in the one frequency band or the other frequency band.

The control method may further include, prior to the combining of signals, receiving, by a selector, receives a plurality of signals from the first antenna or the second antenna in the frequency band, which is not selected by the user between the one frequency band and the other frequency band, as the fundamental frequency band; and extracting, by the third filter, a signal in the frequency band that is selected by the user among the plurality of signals received by the selector.

The control method may further include, prior to the combining of signals, storing a signal extracted by the third filter in a storage.

The combining of signals may include combining, by the controller, a signal extracted by the first filter or the second filter with a signal extracted by the third filter.

Furthermore, in accordance with embodiments of the present disclosure, a vehicle can include: a first antenna configured to receive a first plurality of signals including a signal in one frequency band as a signal in a fundamental frequency band and a signal in another frequency band as a signal in a harmonic frequency band; a second antenna configured to receive a second plurality of signals including a signal in the other frequency band as a signal in the fundamental frequency band and a signal in the one frequency band as a signal in a harmonic frequency band; and a controller configured to combine a signal from the first plurality of signals in a frequency band that is selected by a user with a signal from the second plurality of signals in the frequency band that is selected by the user.

The vehicle may further include a first filter configured to extract a signal in the one frequency band from the first plurality of signals; and a second filter configured to extract a signal in the other frequency band from the second plurality of signals.

The vehicle may further include a selector configured to receive a plurality of signals from the first antenna or the second antenna in the frequency band, which is not selected by the user between the one frequency band and the other frequency band, as the fundamental frequency band; and a third filter configured to extract a signal in the frequency band that is selected by the user among the plurality of signals received by the selector.

The vehicle may further include a signal storage to store signals extracted by the third filter.

The controller may be further configured to combine a signal extracted by the first filter or the second filter with a signal extracted by the third filter.

The vehicle may further include an input device configured to receive a frequency band from the user and to transmit the received frequency band to the controller.

BRIEF DESCRIPTION OF THE DRAWINGS

These and/or other aspects of the disclosure will become apparent and more readily appreciated from the following description of embodiments, taken in conjunction with the accompanying drawings of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, embodiments will now be described more fully hereinafter with reference to the accompanying drawings. The embodiments may, however, be embodied in many different forms and should not be construed as being limited to the embodiments set forth herein. These embodiments are provided so that this disclosure will be thorough and complete and will fully convey the embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Reference will now be made in detail to embodiments of the present disclosure, examples of which are illustrated in the accompanying drawings, wherein like reference numerals refer to like elements throughout.

Figure 1:
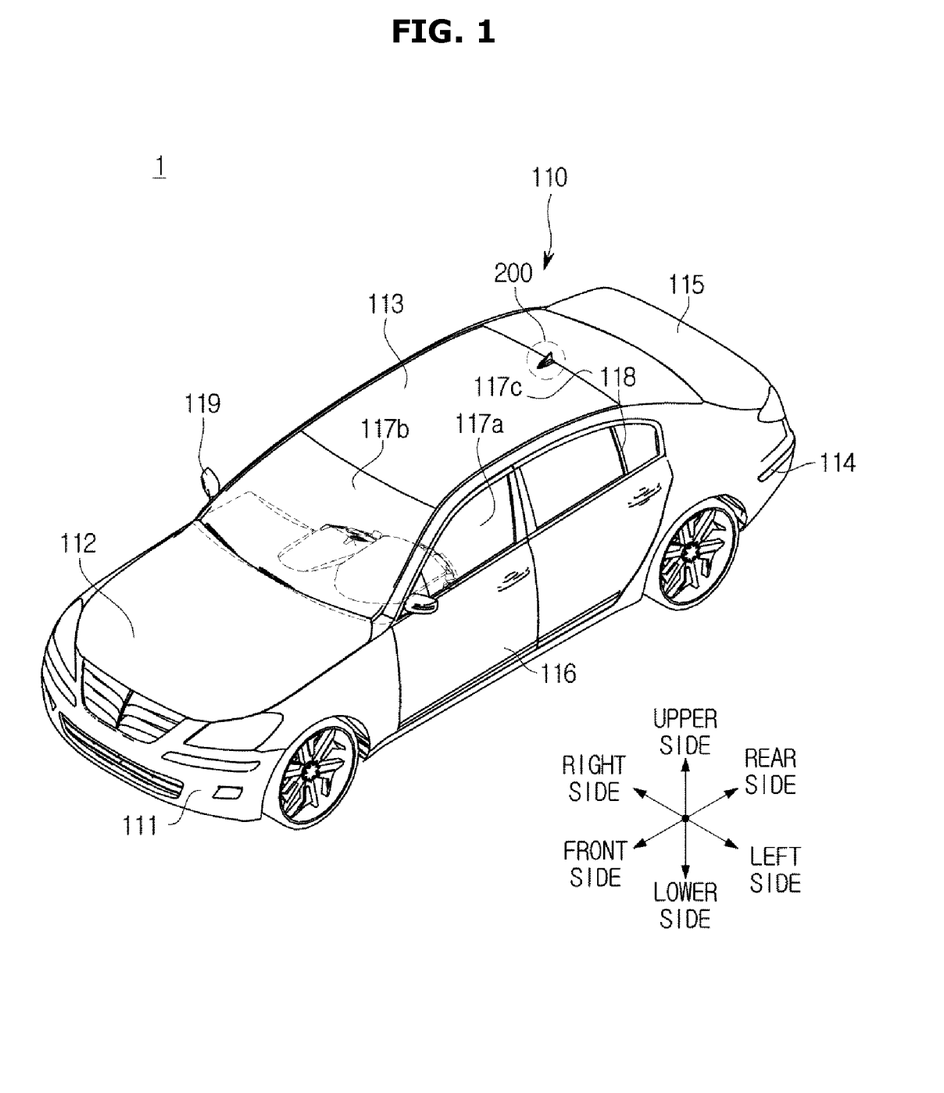
FIG. 1 is a view of a vehicle, in which an antenna in accordance with embodiments of the present disclosure is provided.
Figure 2:
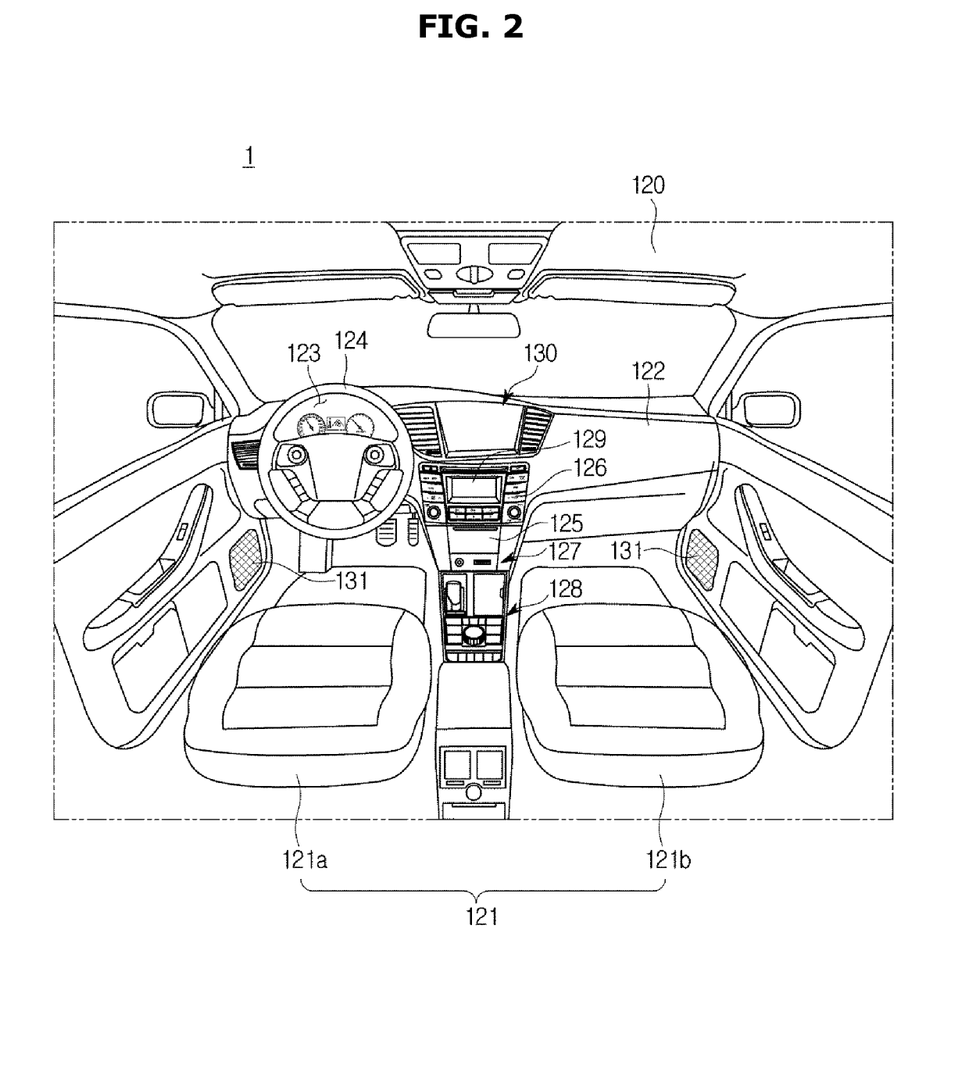
FIG. 2 is a view of an interior of the vehicle of FIG. 1.

FIG. 1 is a view of a vehicle, in which an antenna in accordance with embodiments of the present disclosure is provided, and FIG. 2 is a view of an interior of the vehicle of FIG. 1.

As is generally known, a vehicle 1 may be a driving apparatus in order to transfer people and cargo by driving a vehicle wheel, and may be moved on the road.

The vehicle 1 may include a body having an interior and an exterior, and a chassis, which is the rest of the vehicle, aside from the body, and in which a mechanical apparatus needed for the driving is installed.

As illustrated in FIG. 1, an exterior 110 of the body may include a front panel 111, a bonnet 112, a roof panel 113, a rear panel 114, a trunk 115, and front, rear, left, and right door 116.

The exterior of the body may include the front panel 111, the bonnet 112, the roof panel 113, the rear panel 114, the trunk 115, a window glass 117a, 117b, and 117c provided in the front, rear, left, and right door 116, and a pillar 118 provided in the boundary between the front, rear, left, and right window glasses 117a, 117b, and 117c.

The window glass 117a, 117b, and 117c provided in the front, rear, left, and right door may include a side window glass 117a, a front window glass 117b installed in the front side, and a rear window glass 117c installed in the rear side.

The exterior of the body may further include a side mirror 119 providing the view of the rear side of the vehicle to a driver.

The chassis of the vehicle may further include a power generation device, a power transmission device, a driving device, a steering system, a brake system, a suspension device, a transmission device, a fuel system and front, rear, left and right vehicle wheels.

The vehicle may further include a variety of safety devices for a driver and passenger safe.

The safety devices of the vehicle may include a variety of safety devices, such as an air bag control device for the safety of the driver and passenger when the collision of the vehicle, and an Electronic Stability Control (ESC) configured to keep the stability of the vehicle when accelerating or cornering.

In addition, the vehicle 1 may further include a detection device, such as a proximity sensor configured to detect an obstacle or another vehicle in the rear or lateral side, and a rain sensor configured to detect whether to rain or an amount of rain.

The vehicle 1 may include an Electronic Controller (ECU) configured to control the operation of the power generation device, the power transmission device, the driving device, the steering system, the brake system, the suspension device, the transmission device, the fuel system, the variety of safety devices, and the variety of sensors.

The vehicle 1 may selectively include electronic devices such as a hand-free device, a GPS, an audio device, a bluetooth device, a rear camera, a device for charging terminal device, and a high-pass device, all of which are installed for the convenience of the driver.

The vehicle 1 may further include an ignition button configured to input an operation command to an ignition motor (not shown).

That is, when the ignition button is turned on, the vehicle 1 may drive the ignition motor (not shown) and then drive an engine (not shown), which is a power generation device, through the operation of the ignition motor.

The vehicle 1 may further include a battery (not shown) which is electrically connected to a terminal device, an audio device, an interior light, an ignition motor, and other electronics to supply a power electricity.

The battery may perform charging by using a power of the self-generator or the engine while the vehicle drives.

The vehicle 1 may further include an antenna apparatus 200 provided in the roof panel 113 to receive a radio signal, a broadcast signal, and a satellite signal, and to transmit and receive a signal to and from another vehicle, a server, and a base station. FIG. 1 illustrates that the antenna apparatus 200 is installed in the roof panel 113, but is not limited thereto. Alternatively, the antenna apparatus 200 may be installed in the front window glass 117b or the rear window glass 117c such that the antenna apparatus 200 is coupled to a glass antenna.

The antenna apparatus 200 will be described later.

It is understood that the exterior of the vehicle 1, as described above and illustrated in FIG. 1, is provided merely for demonstration purposes and does not limit the scope of the present disclosure.

As illustrated in FIG. 2, the interior 120 of the body may include a seat 121; 121a and 121b on which a passenger is seated, a dashboard 122, an instrument panel that is a cluster, 123, a steering wheel 124 to change the direction of the vehicle, and a center fascia 125 in which an operation panel of the audio device and the air conditioning device are installed, wherein the instrument panel may be disposed on the dashboard and may include tachometer, speedometer, coolant temperature indicator, fuel indicator, turn signal indicator, high beam indicator light, warning lights, seat belt warning light, trip odometer, odometer, automatic transmission selector lever indicator, door open warning light, oil warning light, and a low fuel warning light.

The seat 121 may include a driver seat 121a on which a driver is seated, a passenger seat 121b on which a passenger is seated, and a rear seat provide in the rear side of the inside of the vehicle.

The cluster 123 may be implemented in a digital manner. The cluster 123 in the digital manner may display vehicle information and driving information as an image.

The center fascia 125 may be disposed between the driver seat 121a and the passenger seat 121b on the dashboard 122, and may include a head unit 126 configured to control the audio device, the air conditioning device and a hot-wire in the seat.

The head unit 126 may include a plurality of buttons to receive an input of an operation command for the audio device, the air conditioning device, and the hot-wire in the seat.

In the center fascia 125, an air outlet, a cigar jack, and a multi-terminal 127 may be installed.

The multi-terminal 127 may be disposed adjacent to the head unit 146, and may further include a USB port, an AUX terminal, and a SD slot.

The vehicle 1 may further include an input device 128 configured to receive an operation command of a variety of functions, and a display 129 configured to display information related to a function currently performed, and information input by a user.

The input device 128 may be disposed on at least one of the head unit 126 and the center fascia 125, and may include at least one physical button such as On/Off button for the variety of functions, and a button to change a set value of the variety of functions.

The input device 128 may transmit an operation signal of the button to the ECU, a controller in the head unit 126 or the terminal 130.

The input device 128 may include a touch panel integrally formed with the display unit of the terminal 130. The input device 128 may be activated and displayed as the shape of the button on the display unit of the terminal 130, and may receive an input of the location information of the button displayed.

The input device 128 may further include a jog dial (not shown) or a touch pad to receive a command for moving cursor and selecting cursor, wherein the cursor is displayed on the display unit of the terminal 130.

The jog dial or touch pad may be provided in the center fascia 125.

When a navigation function is selected, the input device 128 may receive an input of information related to the destination, transmit the input destination to the terminal 130, and when a DMB function is selected, the input device 128 may receive an input of information related to the channel and sound volume, and transmit the input channel and sound volume to the terminal 130.

Figure 3:
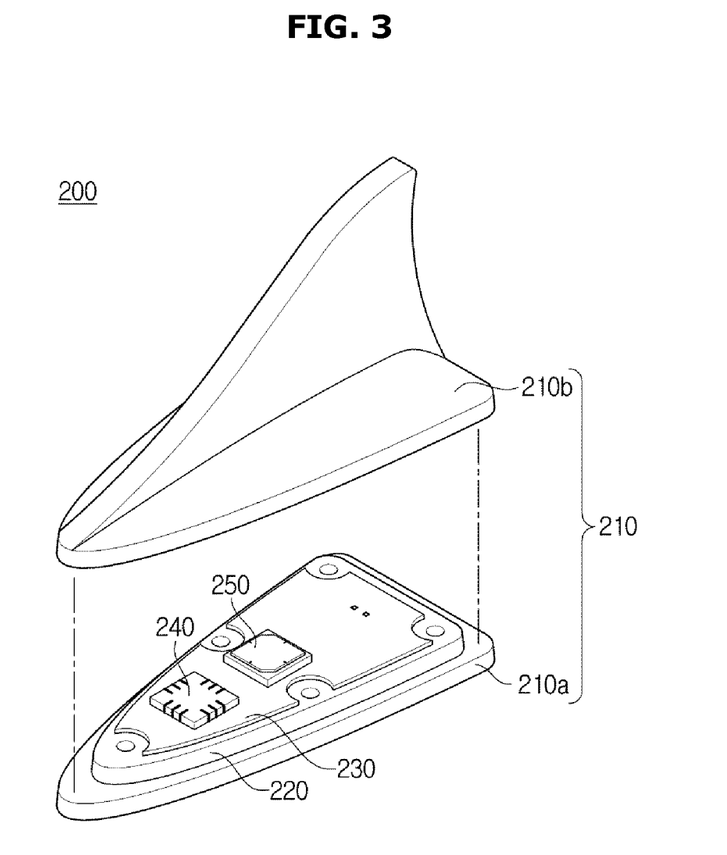
FIG. 3 is a view of an antenna apparatus in accordance with embodiments of the present disclosure.

In addition, when the radio function is selected, the input device 128 may receive a frequency band (e.g., FM band) and a frequency (e.g., 89.1 MHz) from a user, and transmit the received frequency band and frequency information to the antenna apparatus 200 (see FIG. 3).

The terminal 130 configured to receive information from a user and configured to output a result corresponding to the input information may be provided in the center fascia 125.

The terminal 130 may perform at least one function of a navigation function, a DMB function, an audio function, and a video function, and may display information related to the road condition and the driving during the autonomous driving mode.

The terminal may be installed on the dash board to be hung.

A sound portion 131 may output sound when the radio function or the audio function is performed. When the radio function is performed, the sound portion 131 may receive a sound signal corresponding to a frequency, which is input from a user, from the antenna apparatus and output the sound signal to the user.

It is understood that the interior of the vehicle 1, as described above and illustrated in FIG. 2, is provided merely for demonstration purposes and does not limit the scope of the present disclosure.

FIG. 3 is a view of an antenna apparatus in accordance with embodiments of the present disclosure.

As illustrated in FIG. 3, the antenna apparatus 200 may include a housing 210 including a bottom member 210*a* mounted to the roof panel 113 of the body and a cover member 210*b* coupled to the bottom member 210*a* and configured to cover internal components.

The bottom member 210*a* may be formed by including synthetic resins, and mounted to the body so that foreign material may be prevented from being introduced into with the cover member 210*b*, and relieve a shock delivered from the body.

The bottom member 210*a* may be installed in the rear side of the upper portion of the vehicle so that the interference with adjacent components may be less and thus the reception rate of radio signal may be secured.

The bottom member 210*a* may be formed to have a shape having the cross-sectional area thereof being increased as being toward the rear side, and thus the wind resistance and the noise, both of which are generated when the body is moved, may be reduced.

The housing 210 may be formed having a shark fin-like shape.

The antenna apparatus 200 may include a base member 220 disposed in the bottom member 210*a*, and a driving module 230 disposed in the base member 220.

The base member 220 may be coupled to the bottom member 210*a* in a bonding or bolting manner, and may be coupled to the driving module 230 in a bolting manner.

The base member 220 may provide a space to which the driving module 230 and a plurality of antennas 240, and 250 are mounted.

The driving module 230 may be provided as a printed circuit board (PCB) having a wiring formed by a cooper in an etching manner on a substrate.

The driving module 230 may include a hole through which a wire passes.

The driving module 230 may include a signal process circuit to process a signal in a way of amplifying or filtering a signal received through the plurality of antennas 240 and 250, respectively.

The signal process circuit for the plurality of antennas may be separately provided in the antennas 240 and 250.

The driving module 230 may transmit a signal to the controller (ECU) mounted on the inside of the body or the terminal.

The driving module 230 may extract a signal in a predetermined frequency band such as a FM signal or Digital Audio Broadcasting (DAB) signal and optimize the signal.

The driving module 230 may be implemented as a single integrated reception module by mounting components such as a band pass filter (BPF), a switch, a tuner, a buffer and a Digital Signal Processor (DSP), to a circuit board.

The plurality of antennas 240 and 250 may include a first antenna 240 and a second antenna 250.

The first antenna 240 may be seated in the driving module 230.

The first antenna 240 may be an antenna operating in a first frequency band, wherein the first antenna 240 may receive a signal in the first frequency band as a signal in the fundamental frequency band. For example, the first frequency band may be a FM band. A signal in the FM band may represent a signal in a frequency band from 88 MHz or more to 108 MHz or less.

The first antenna 240 may receive a signal in a second frequency band, other than the first frequency band, as a signal in a harmonic frequency band. For example, the second frequency band may be a DAB band. A signal in the DAB band may represent a signal in the frequency band from 174 MHz or more to 240 MHz or less.

The first antenna 240 may be seated on the driving module 230 and transmit the received signal to the driving module 230.

The second antenna 250 may be seated on the driving module 230 while being spaced apart from the first antenna 240.

The second antenna 250 may be an antenna operating in the second frequency band, wherein the second antenna 250 may receive a signal in the second frequency band as a signal in the fundamental frequency band.

The second antenna 250 may receive a signal in the first frequency band, other than the second frequency band, as a signal in the harmonic frequency band.

The first antenna 240 and second antenna 250 may employ a variety of antennas such as a chip antenna, and a microstrip patch antenna as well as a coil antenna.

Hereinafter a configuration of the driving module 230 to transmit and receive a signal by using the first and second antennas 240 and 250 will be described with reference to FIG. 4.

Figure 4:
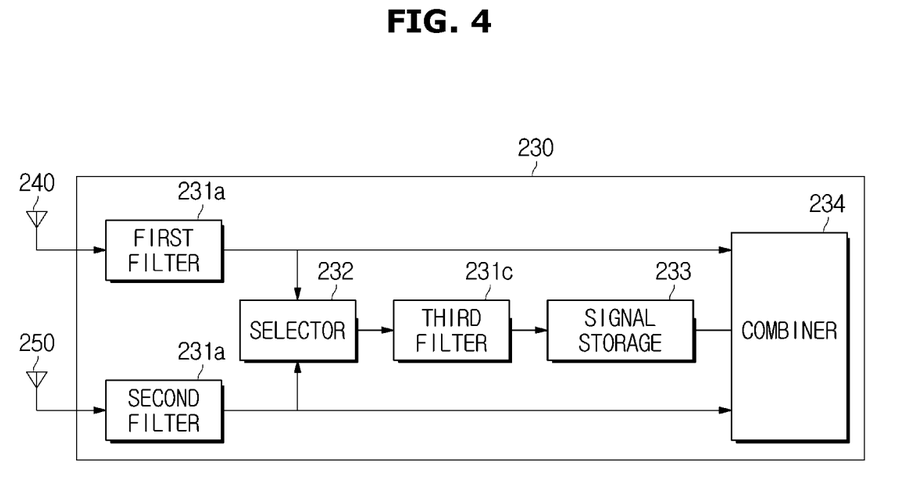
FIG. 4 is a control block diagram illustrating a driving module of an antenna apparatus according to embodiments of the present disclosure.

FIG. 4 is a control block diagram illustrating a driving module of an antenna apparatus according to embodiments of the present disclosure.

The driving module 230 of the antenna apparatus 200 may include a filter 231a, 231b, and 231c, a selector 232, a signal storage 233, and a combiner 234.

The filter 231a, 231b and 231c may include a first filter 231a extracting a signal in the first frequency band from signals (i.e., "a first plurality of signals") received by the first antenna 240, a second filter 231b extracting a signal in the second frequency band from signals (i.e., "a second plurality of signals") received by the second antenna 250, and a third filter 231c extracting a signal in the first or second frequency band. The first filter 231a and the second filter 231b may be implemented as a band pass filter (BPF), and the third filter 231c may be implemented as dual band pass filter.

When between the first and second frequency bands, any one frequency band which is desired to receive by a user, is referred to as "selected band" and the other frequency band is referred to as "unselected band", the selector 232 may transmit a signal, which is received by an antenna having the unselected band as the fundamental frequency band, to the third filter 231c.

Particularly, when the user selects the first frequency band, the selector 232 may transmit signals received by the second antenna 250, to the third filter 231c, wherein the third filter 231c may extract signals in the first frequency band, among the signals received by the second antenna 250, and transmit the extracted signals, to the signal storage 233.

On the contrary, when the user selects the second frequency band, the selector 232 may transmit signals received by the first antenna 240 to the third filter 231c, wherein the third filter 231c may extract signals in the second frequency band from the signals received by the first antenna 240, and transmit the extracted signal to the signal storage 233.

The selector 232 may be implemented as a switch configured to selectively transmit the signal in the first antenna 240 or the second antenna 250, to the third filter 231c.

The signal storage 233 may store the signal transmitted from the third filter 231c. The signal storage 233 may be implemented as a buffer.

The combiner 234 may include a controller generating a first combined signal or a second combined signal, and a tuner extracting a signal in a selected frequency by tuning a frequency selected by the user.

The controller may generate a combined signal by combining a signal, which is in the filter extracting a signal in a selected band between the first filter 231a and the second filter 231b, with a signal stored in the signal storage 233.

That is, when the selected band is the first frequency band, the controller may generate a combined signal by combining a signal in the first frequency band, which is extracted by the first filter 231a from the signals (i.e., "a first plurality of signals") received by the first antenna 240, with a signal in the first frequency band, which is extracted by the third filter 231c from the signals (i.e., "a second plurality of signals") received by the second antenna 250.

On the contrary, when the selected band is the second frequency band, the controller may generate a combined signal by combining a signal in the second frequency band, which is extracted by the second filter 231b from the signals (i.e., "a second plurality of signals") received by the second antenna 250, with a signal in the second frequency band, which is extracted by the third filter 231c from the signals received by the first antenna 240 (i.e., "a first plurality of signals").

As well as generating the combined signal, the controller may control the first filter 231a so that the first filter 231a extracts a signal in the first frequency band, control the second filter 231b so that the second filter 231b extracts a signal in the second frequency band, and control the third filter 231c so that the third filter 231c extracts a signal in the selected frequency band, based on the frequency band information transmitted from the input device 128 of the vehicle 1. The controller may determine an antenna having the unselected band as the fundamental frequency band, and control the selector 232 so that the selector 232 transmits a signal of the determined antenna, to the third filter 231c.

The controller may be implemented as a separate module from the combiner 234.

The controller may be implemented using a memory (not shown) storing an algorithm for controlling an operation of components in the antenna apparatus 200 and data related to programs implementing the algorithm, and a processor (not shown) performing the above mentioned operation using the data stored in the memory. The memory and the processor may be implemented in separate chips, or a single chip.

In addition, the controller may transmit a signal to the electronic controller (ECU) or the terminal described above with reference to FIG. 2. In this case, a Controller Area Network (CAN) communication method may be used to transmit signals.

The tuner may provide a signal in a frequency, which is selected from a user, to the sound portion 131 of the vehicle 1 as a sound signal. The tuner may be tuned to the selected frequency via the input device 128 of the vehicle 1 shown in FIG. 2.

In response to the performance of the components of the antenna apparatus 200 illustrated in FIG. 4, at least one component may be added to or deleted. It will be readily understood by those skilled in the art that the mutual position of the components can be changed corresponding to the performance or structure of the system.

Meanwhile, each of the components shown in FIG. 4 refers to software and/or hardware components such a Field Programmable Gate Array (FPGA) and an Application Specific Integrated Circuit (ASIC).

Hereinafter, the operation of the antenna apparatus 200 according to embodiments of the present disclosure will be described with reference to FIGS. 5 to 7.

Figure 5:
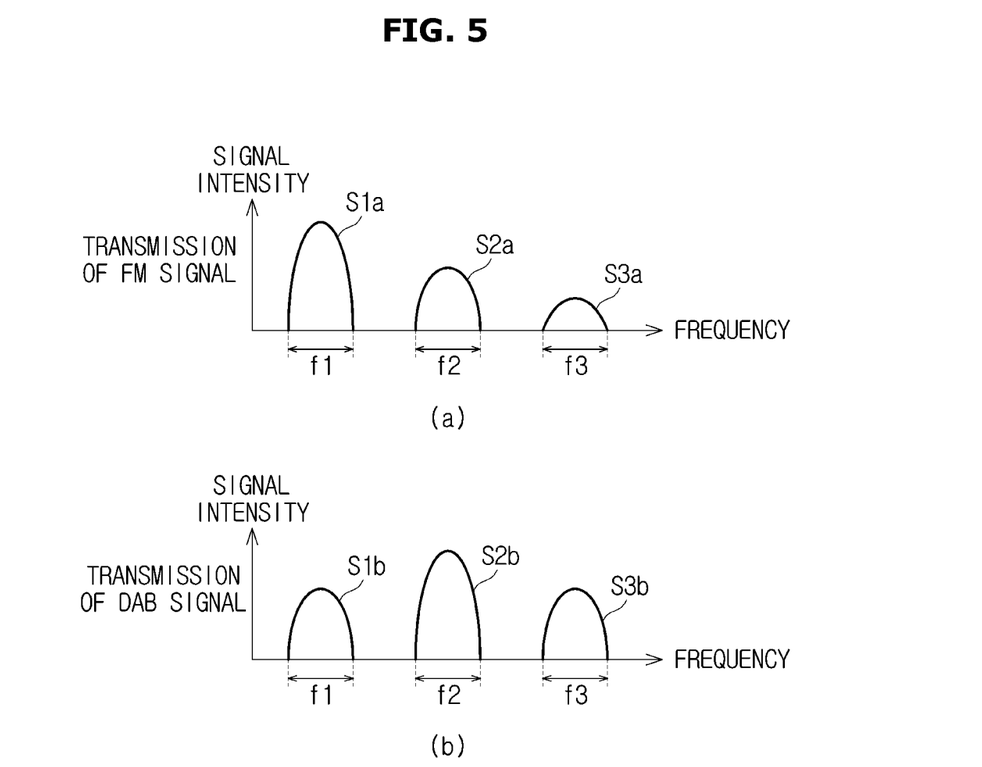
FIG. 5 is a graph illustrating signals transmitted from the outside for each frequency band.
Figure 6:
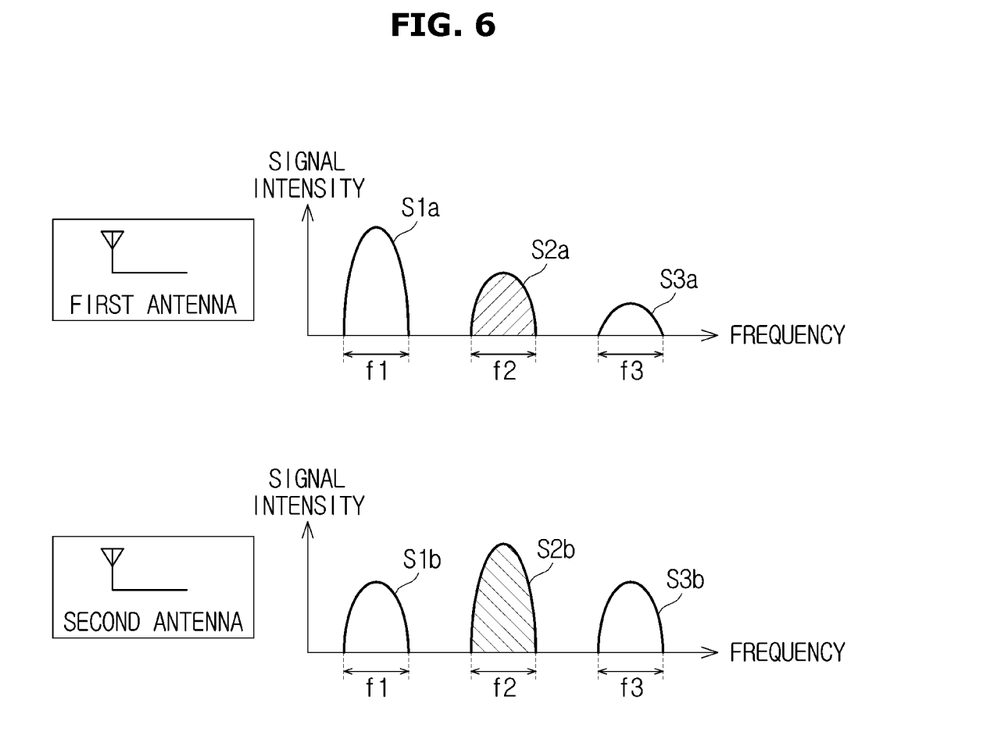
FIG. 6 is a graph illustrating signals received by the antenna apparatus, for each frequency band according to embodiments of the present disclosure.
Figure 7:
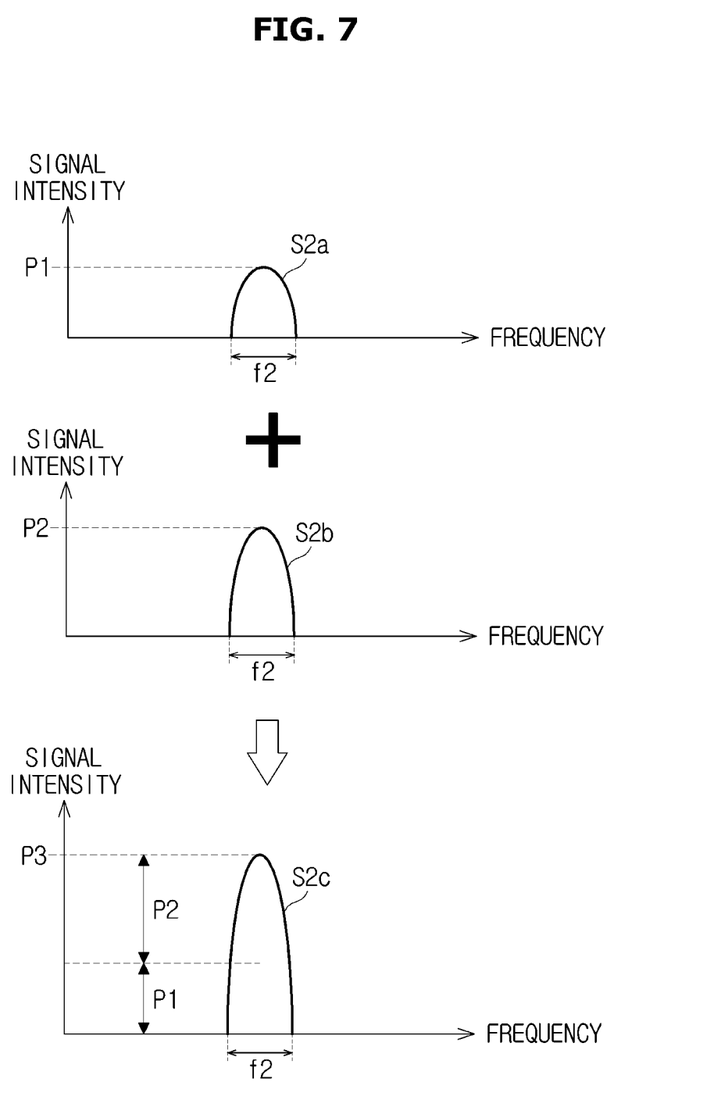
FIG. 7 is a graph illustrating a signal extraction and combination process of the antenna apparatus according to embodiments of the present disclosure.

FIG. 5 is a graph illustrating signals transmitted from the outside for each frequency band, FIG. 6 is a graph illustrating signals received by the antenna apparatus, for each frequency band according to embodiments of the present disclosure, and FIG. 7 is a graph illustrating a signal extraction and combination process of the antenna apparatus according to embodiments of the present disclosure. For convenience of description, it is assumed that a signal in the FM band and a signal in the DAB band are transmitted. Components of the antenna apparatus 200 described in FIGS. 5 to 7 will be the same components of the antenna apparatus 200 shown in FIG. 4, and thus the same reference numerals will be referred for the description.

Referring first to FIG. 5, when a signal in the FM band is transmitted from a broadcasting station, not only a signal S1a in a frequency band of 88 MHz or more to 108 MHz or less, corresponding to the fundamental frequency band f1, but also signals S2a and S3a in the harmonic frequency bands f2 and f3 may also be transmitted. In the same manner, when a signal in the DAB band is transmitted from the broadcasting station, not only a signal S2b in a frequency band of 174 MHz or more to 240 MHz or less, corresponding to the fundamental frequency band f2 but also signals S1b and S3b in the harmonic frequency bands f1 and f3 may also be transmitted. During the transmission of the signal in the FM band, the signal S2a in the frequency band f2 may be a harmonic component about the FM band, and during the transmission of the signal in the DAB band, the signal S1b in the frequency band f1 may be a harmonic component about the DAB band.

Referring next to FIG. 6, according to embodiments of the present disclosure, the first antenna 240 and the second antenna 250 of the antenna apparatus 200 may be operated in the FM band and the DAB band, respectively.

The first antenna 240 may receive the signal S1a in the first frequency band f1 corresponding to the fundamental frequency band, the signal S2a in the second frequency band f2 and the signal S3a in the third frequency band f3 corresponding to the harmonic frequency band.

The second antenna 250 may receive the signal S2b in the second frequency band f2 corresponding to the fundamental frequency band, the signal S1b in the first frequency band f1 and the signal S3b in the third frequency band f3 corresponding to the harmonic frequency band.

When a user selects a frequency in the DAB band, the second filter 231b of the antenna apparatus 200 may extract the signal S2b in the second frequency band f2 among the signals S1b, S2b, and S3b received by the second antenna 250, and the selector 232 may transmit the signals S1a, S2a, and S3a received by the first antenna 240, to the third filter 231c.

Accordingly, the third filter 231c may extract the signal S2a in the second frequency band f2 from the signals S1a, S2a, and S3a received by the first antenna 240. The extracted signal S2a may be stored in the signal storage 233.

Referring next to FIG. 7, the combiner 234 may generate a combined signal S2c by combining the signal S2a in the second frequency band f2, which is stored in the signal storage 233, with the signal S2b in the second frequency band f2, which is extracted by the second filter 231b. In the combined signal S2c, a signal in a frequency, which is selected via the input device 128 of the vehicle 1, may be a sound signal and thus the sound signal may be provided to the sound portion 131 of the vehicle 1.

When additionally using the signal S2a received by the first antenna 240 during receiving a signal in the DAB band, the intensity of the signal may be increased (i.e., P3=P1+P2) in comparison with a case of only using the signal S2b received by the second antenna 250. Therefore, the quality of the signal may be improved.

Although the second antenna 250 operated in the DAB band is not provided, it may be possible to implement the diversity method using the first antenna 240 receiving the signal in the FM band. Thus, it may be possible to reduce the number of antennas which operate in the DAB band.

Although not shown, when a user selects a frequency in the FM band, the first filter 231a may extract the signal S1a in the first frequency band f1 among the signals S1a, S2a, and S3a received by the first antenna 240, and the selector 232 may transmit the signals S1b, S2b, and S3b received by the second antenna 250, to the third filter 231c, unlike the above-described process. Accordingly, the third filter 231c may extract the signal S1b in the first frequency band f1 from the signals S1b, S2b, and S3b received by the second antenna 250. The extracted signal S1b may be stored in the signal storage 233. The combiner 234 may generate a combined signal by combining the signal S1b in the first frequency band f1, which is stored in the signal storage 233, with the signal S1a in the first frequency band f1, which is extracted by the first filter 231a.

Although the first antenna 240 operated in the FM band is not provided, it may be possible to implement the diversity method using the first antenna 240 operated in the DAB band. Thus, it may be possible to reduce the number of antennas which operate in the FM band.

As is apparent from the above description, according to the proposed antenna apparatus, it may be possible to improve the reception performance of the antenna apparatus by using the existing antenna operated in the different frequency band, without additionally installing other antenna operated in the same frequency band as any one antenna.

Although certain embodiments of the present disclosure have been shown and described, it would be appreciated by those skilled in the art that changes may be made in these embodiments without departing from the principles and spirit of the disclosure, the scope of which is defined in the claims and their equivalents.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above-described embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An antenna apparatus comprising:
a first antenna configured to receive a first plurality of signals including a signal in one frequency band as a signal in a fundamental frequency band and a signal in another frequency band as a signal in a harmonic frequency band;
a second antenna configured to receive a second plurality of signals including a signal in the other frequency band as a signal in the fundamental frequency band and a signal in the one frequency band as a signal in the harmonic frequency band;
a controller configured to combine a signal from the first plurality of signals in a frequency band that is selected by a user with a signal from the second plurality of signals in the frequency band that is selected by the user;
a first filter configured to extract a signal in the one frequency band from the first plurality of signals received by the first antenna;
a second filter configured to extract a signal in the other frequency band from the second plurality of signals received by the second antenna;
a selector configured to receive a plurality of signals from the first antenna or the second antenna having a frequency band, which is not selected by the user between the one frequency band and the other frequency band, as the fundamental frequency band; and
a third filter configured to extract a signal in the frequency band that is selected by the user among the plurality of signals received by the selector,
wherein the controller is further configured to combine a signal extracted by the first or second filter, with a signal extracted by the third filter.

2. The antenna apparatus of claim 1, further comprising:
a signal storage configured to store signals extracted by the third filter.

3. The antenna apparatus of claim 1, wherein
the one frequency band comprises frequencies from 88 MHz to 108 MHz, and the other frequency band comprises frequencies from 174 MHz to 240 MHz.

4. The antenna apparatus of claim 1, further comprising:
a tuner configured to extract a signal in the frequency band selected by the user by tuning a frequency in the frequency band selected by the user.

5. The antenna apparatus of claim 1, further comprising:
a housing having a shark fin-like shape.

6. A control method of an antenna apparatus comprising:
receiving a first plurality of signals via a first antenna, the first plurality of signals including a signal in one frequency band as a signal in a fundamental frequency band and a signal in another frequency band as a signal in a harmonic frequency band;
receiving a second plurality of signals via a second antenna, the second plurality of signals including a signal in the other frequency band as a signal in the fundamental frequency band and a signal in the one frequency band as a signal in a harmonic frequency band; and
combining, by a controller, a signal from the first plurality of signals in a frequency band that is selected by a user with a signal from the second plurality of signals in the frequency band that is selected by the user,
wherein the antenna apparatus further includes:
a first filter configured to extract a signal in the one frequency band from the first plurality of signals received by the first antenna;
a second filter configured to extract a signal in the other frequency band from the second plurality of signals received by the second antenna; and
a third filter configured to extract a signal in the one frequency band or the other frequency band,
wherein prior to the combination, the method includes an operation in which a selector receives a plurality of signals from the first antenna or the second antenna having a frequency band, which is not selected by the user between the one frequency band and the other frequency band, as the fundamental frequency band; and an operation in which the third filter extracts a signal in a frequency band, which is selected by the user among the plurality of signals received by the selector, and
wherein the combination comprises an operation in which the controller combines a signal extracted by the first or second filter with a signal extracted by the third filter.

7. The control method of claim 6, further comprising:
prior to the combining of signals, storing a signal extracted by the third filter in a storage.

8. A vehicle comprising:
a first antenna configured to receive a first plurality of signals including a signal in one frequency band as a signal in a fundamental frequency band and a signal in another frequency band as a signal in a harmonic frequency band;
a second antenna configured to receive a second plurality of signals including a signal in the other frequency band as a signal in the fundamental frequency band and a signal in the one frequency band as a signal in a harmonic frequency band;
a controller configured to combine a signal from the first plurality of signals in a frequency band that is selected by a user with a signal from the second plurality of signals in the frequency band that is selected by the user;
a first filter configured to extract a signal in the one frequency band from the first plurality of signals received by the first antenna;

a second filter configured to extract a signal in the other frequency band from the second plurality of signals received by the second antenna;

a selector configured to receive a plurality of signals from the first antenna or the second antenna having a frequency band, which is not selected by the user between the one frequency band and the other frequency band, as the fundamental frequency band; and a third filter configured to extract a signal in the frequency band that is selected by the user among the plurality of signals received by the selector, wherein the contoller combines a signal extracted by the first or second filter, with a signal extracted by the third filter.

9. The vehicle of claim 8, further comprising:

a signal storage configured to store signals extracted by the third filter.

10. The vehicle of claim 8, further comprising:

an input device configured to receive a frequency band from the user and to transmit the received frequency band to the controller.

* * * * *